(12) United States Patent
Li

(10) Patent No.: US 10,250,621 B1
(45) Date of Patent: Apr. 2, 2019

(54) AUTOMATIC EXTRACTION OF INDICATORS OF COMPROMISE FROM MULTIPLE DATA SOURCES ACCESSIBLE OVER A NETWORK

(71) Applicant: EMC IP Holding Company LLC, Hopkinton, MA (US)

(72) Inventor: Zhou Li, Malden, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 246 days.

(21) Appl. No.: 15/354,680

(22) Filed: Nov. 17, 2016

(51) Int. Cl.
  *H04L 29/06* (2006.01)
  *G06F 16/951* (2019.01)
  *G06F 16/955* (2019.01)

(52) U.S. Cl.
  CPC ...... *H04L 63/1416* (2013.01); *H04L 63/1425* (2013.01); *G06F 16/951* (2019.01); *G06F 16/9558* (2019.01)

(58) Field of Classification Search
  CPC .... H04L 63/14–63/1491; H04L 63/302; G06F 17/30882; G06F 17/30864
  See application file for complete search history.

(56) References Cited

U.S. PATENT DOCUMENTS

| | | | |
|---|---|---|---|
| 9,015,231 B1 | 4/2015 | Hodgman et al. | |
| 2014/0358888 A1* | 12/2014 | Whitelaw | H04L 67/22 707/709 |
| 2016/0065599 A1* | 3/2016 | Hovor | G06F 21/55 726/23 |
| 2017/0187742 A1* | 6/2017 | Rogers | H04L 63/1433 |

OTHER PUBLICATIONS

McMillen, Indicators of compromise—Finding the footprints that attackers leave behind when they breach your defenses, IBM, Jun. 2015.*
O. Catakoglu et al., "Automatic Extraction of Indicators of Compromise for Web Applications," ACM 25th International Conference on World Wide Web (WWW), Apr. 11-15, 2016, pp. 333-343, Montreal, Quebec, Canada.

(Continued)

*Primary Examiner* — Minh Dinh
(74) *Attorney, Agent, or Firm* — Ryan, Mason & Lewis, LLP

(57) ABSTRACT

A processing device in one embodiment comprises a processor coupled to a memory and is configured to direct one or more web crawlers to obtain textual information from a plurality of data sources accessible over at least one network, to extract terms likely to be associated with indicators of compromise from the obtained textual information, to filter the extracted terms to identify terms corresponding to respective valid indicators of compromise, to generate links between the terms corresponding to the respective valid indicators of compromise, and to convert the links and the corresponding terms into an output document in a specified indicator of compromise format. Feedback from an analyst device receiving the output document may be used to adjust a filter parameter of the extracted term filtering. Additionally or alternatively, one or more parameters of a network security system may be adjusted based at least in part on the output document.

20 Claims, 4 Drawing Sheets

(56) References Cited

OTHER PUBLICATIONS

Eric Dezenhall, "A Look Back at the Target Breach," http://www.huffingtonpost.com/eric-dezenhall/a-look-back-at-the-target_b_7000816.html, Apr. 6, 2015, 5 pages.
dnsbl.info, "What is a DNSBL?" http://www.dnsbl.info/, 2016, 1 page.
github.com, "OpenWPM," https://github.com/citp/OpenWPM, Nov. 8, 2016, 3 pages.
Will Gragido, "Understanding Indicators of Compromise (IOC) Part I," http://blogs.rsa.com/understanding-indicators-of-compromise-ioc-part-i/, Oct. 3, 2012, 6 pages.
Chris Harrington, "Sharing Indicators of Compromise: An Overview of Standards and Formats," https://www.rsaconferene.com/writable/presentations/file_upload/dsp-w25a.pdf, Feb. 27, 2013, 15 pages.
R. Danyliw et al., "The Incident Object Description Exchange Format," Network Working Group, Request for Comments: 5070, http://www.ietf.org/rfc/rfc5070.txt, Dec. 2007, 92 pages.
M.K. Anjali et al., "Ambiguities in Natural Language in Computer and Communication Engineering," International Journal of Innovative Research in Computer and Communication Engineering, Oct. 2014, pp. 392-394, vol. 2, No. 5.
Kris Kendall, "Practical Malware Analysis" Black Hat Conference, 2007, pp. 1-10.
S. MacCaglia et al., "RSA Incident Response Report: Threat Detection Techniques—ATM Malware," http://blogs.rsa.com/wp-content/uploads/2016/02/ATM-Paper_February_16_final.pdf, Feb. 2016, 14 pages.
Denis Makrushin, "Indicators of Compromise as a Way to Reduce Risk," https://securelist.com/blog/security-policies/71915/indicators-of-compromise-as-a-way-to-reduce-risk/, Aug. 19, 2015, 8 pages.
openioc.org, "The OpenIOC Framework," http://www.openioc.org/, Nov. 8, 2016, 3 pages.
cyboxproject.githut.io, "About CybOX," http://cyboxproject.github.io/about/, Nov. 9, 2016, 3 pages.
stixproject.github.io, "About STIX," htttps://stixproject.github.io/, Nov. 9, 2016, 4 pages.
David Perera, "21.5 Million Exposed in Second Hack of Federal Office," http://www.politico.com/story/2015/07/federal-government-cyber-attack-breach-21-million-people-affect-119918, Jul. 9, 2015, 2 pages.
Leonard Richardson, "Beautiful Soup: We Called Him Tortoise Because He Taught Us," https://www.crummy.com/software/BeautifulSoup/, Aug. 3, 2016, 3 pages.
C. Sabottke et al., "Vulnerability Disclosure in the Age of Social Media: Exploiting Twitter for Predicting Real-World Exploits," 24th USENIX Security Symposium, Aug. 12-14, 2016, pp. 1041-1056.
medium.com, "Extracting Data from Websites Using Scrapy," https://medium.com/@kaismh/extracting-data-from-websites-using-scrapy-e1e1e357651a#.wmcgmxuw7, Nov. 8, 2016, 11 pages.
securityfocus.com, "Security Focus," http://www.securityfocus.com/, Nov. 8, 2016, 2 pages.
Lenny Zeltser, "Indicators of Compromise Entering the Mainstream Enterprise?" https://zeltser.com/indicators-of-compromise-entering-the-mainstream/, Feb. 3, 2015, 3 pages.

\* cited by examiner

FIG. 4

AUTOMATIC EXTRACTION OF INDICATORS OF COMPROMISE FROM MULTIPLE DATA SOURCES ACCESSIBLE OVER A NETWORK

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, deployment of malware that is utilized by attackers to create networks of compromised computers or "botnets."

Network security systems can be designed to protect a computer network of a large enterprise comprising many thousands of host devices, also referred to herein as simply "hosts." However, enterprise computer networks are in many cases continuously growing in size, and often incorporate a diverse array of host devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on host devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, anti-virus software, firewalls, web proxies and other traditional security technologies typically deployed by enterprise network security systems today often fail at detecting and remediating malicious activity at a sufficiently early stage.

SUMMARY

Illustrative embodiments of the invention advantageously provide techniques for automatic extraction of indicators of compromise from multiple data sources accessible over a network. Such techniques can be used to facilitate the detection and remediation of APTs and other types of malicious activity at an early stage. For example, the extracted indicators of compromise can be used to adjust one or more parameters of a network security system so as to more accurately and efficiently detect and remediate malicious activity.

In one embodiment, a processing device comprises a processor coupled to a memory and is configured to direct one or more web crawlers to obtain textual information from a plurality of data sources accessible over at least one network, to extract terms likely to be associated with indicators of compromise from the obtained textual information, to filter the extracted terms to identify terms corresponding to respective valid indicators of compromise, to generate links between the terms corresponding to the respective valid indicators of compromise, and to convert the links and the corresponding terms into an output document in a specified indicator of compromise format.

Feedback from an analyst device receiving the output document may be used to adjust a filter parameter of the extracted term filtering.

Additionally or alternatively, one or more parameters of a network security system may be adjusted based at least in part on the output document.

A given processing device configured with functionality for automatic extraction of indicators of compromise from multiple data sources in an illustrative embodiment may be implemented, for example, in one or more network devices of the computer network, or in a security analytics system or other type of network security system implemented in or otherwise associated with the computer network. Other illustrative embodiments include, without limitation, methods, apparatus, networks, systems and computer program products comprising processor-readable storage media.

BRIEF DESCRIPTION OF THE DRAWINGS

FIG. 4 shows an example of an output document generated in a particular indicator of compromise format in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
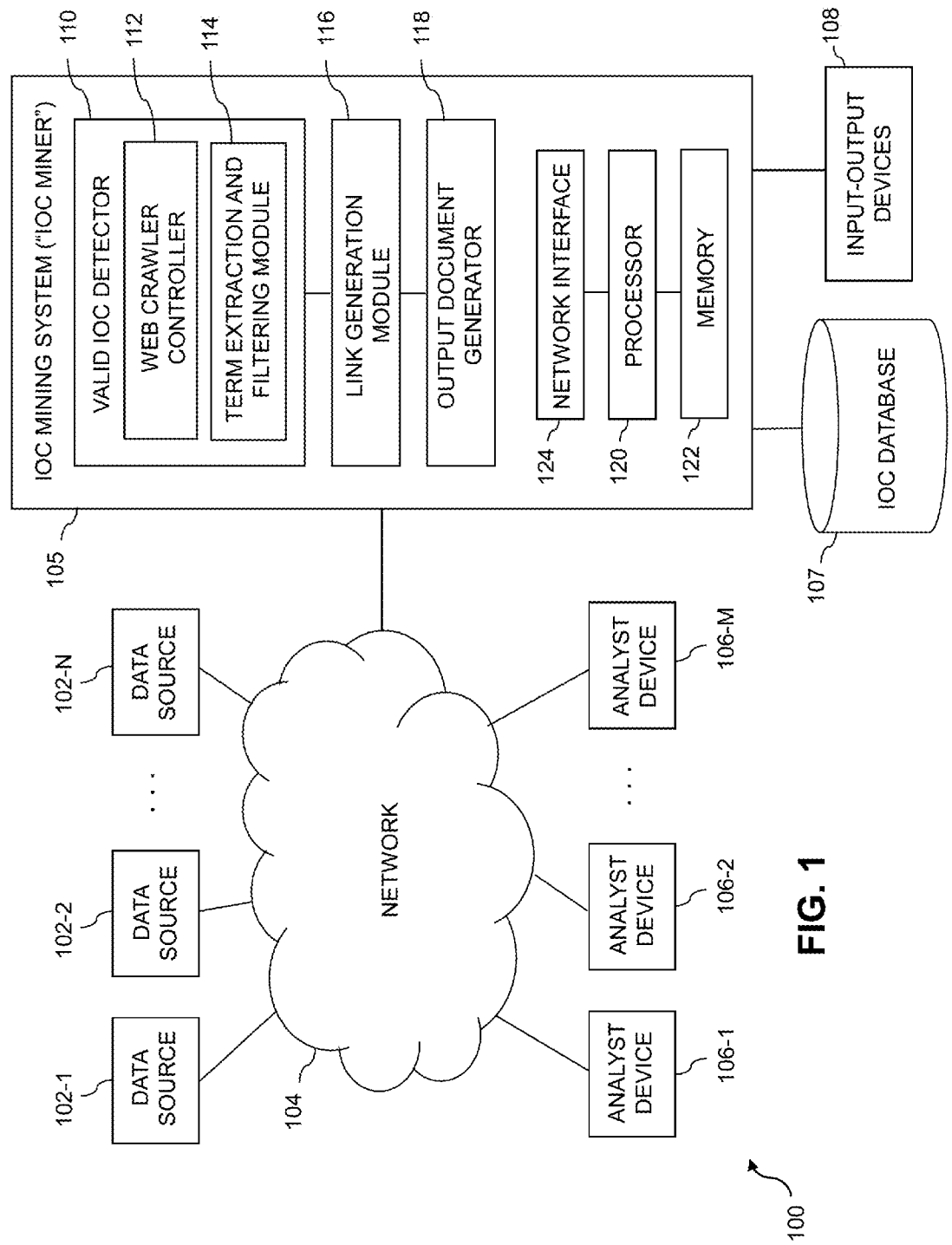
FIG. 1 shows a computer network configured with functionality for automatic extraction of indicators of compromise from multiple data sources in an illustrative embodiment.

FIG. 1 shows a computer network 100 configured in accordance with an illustrative embodiment of the invention. The computer network 100 comprises a plurality of data sources 102-1, 102-2, . . . 102-N, collectively referred to herein as data sources 102. The data sources 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 are an indicator of compromise (IOC) mining system 105, also referred to herein as an "IOC miner," and a plurality of analyst devices 106-1, 106-2, . . . 106-M. The variables N and M denote arbitrary positive integers.

The data sources 102 illustratively comprise public sources of textual descriptions of computer security threats. For example, such public sources may comprise forums, blogs and social media web sites that mention various IOCs in the context of discussing or otherwise describing computer security threats. The term "indicator of compromise" or IOC as used herein is intended to be broadly construed so as to encompass, for example, terms, phrases or other informational units corresponding to particular aspects of APTs or other types of computer security threats.

As a more particular example, IOCs in some embodiments illustratively comprise listings of threat data associated with a known cyberattack. Such threat data may be present in public data sources such as sources of reports comprising in-depth analysis of cyberattacks. These reports may be prepared by security forensics companies that analyze data collected from different sources such as proxy logs, host logs and alerts from security products. Examples of threat data that can be found in reports available from public data sources include the identity of the actors behind the cyberattacks, the particular malware used in the cyberattacks and its typical behaviors, the communication-and-control ("C&C") server list, and other types of information, at least portions of which comprise IOCs.

Conventional techniques generally utilize manual analysis of such reports. However, the number of potential data sources is extremely large and therefore not amenable to manual analysis. For example, thousands of different security companies and researchers publish forums, blogs or social media web sites. As a result, conventional techniques are unable to process sufficient amounts of the publicly-available textual information in a manner that improves detection and remediation of security threats.

The data sources 102 may be implemented in the form of respective computers, servers, network devices or other types of processing devices that provide public access to information. For example, the above-noted forums, blogs and social media web sites may be associated with respective web servers accessible over network 104, although it is to be appreciated that a wide variety of other data sources may be used.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The IOC mining system 105 in some embodiments is implemented as part of a network security system. However, it is also possible for the IOC mining system 105 to be implemented as a stand-alone system that interacts with the data sources 102 and the analyst devices 106 over the network 104. In such an arrangement, for example, a separate network security system may be configured to communicate with the IOC mining system 105 and the analyst devices 106 over the network 104.

The analyst devices 106 may comprise, for example, mobile telephones, laptop computers, tablet computers, desktop computers or other types of devices, in any combination, capable of communicating with the IOC mining system 105 over the network 104. Such devices are examples of what are more generally referred to herein as "processing devices." Some of these processing devices are also generally referred to herein as "computers."

The analyst devices 106 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. An "analyst" as the term is utilized herein is a type of user, and therefore in some embodiments may comprise an automated entity.

The IOC mining system 105 has an associated IOC database 107 configured to store IOC documents and other types of IOC information processed by the IOC mining system 105. The IOC database 107 in the present embodiment is implemented using one or more storage systems associated with the IOC mining system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment. In addition, one or more of the above-listed storage products can be used to implement an internal memory of the IOC mining system 105.

Additional information stored in the IOC database 107 illustratively comprises information obtained from data sources 102. These data sources 102 are accessible to the IOC mining system 105 via the network 104.

Also associated with the IOC mining system 105 are input-output devices 108, which illustratively comprise keyboards, displays or other types of input-output devices in any combination. Such input-output devices are used to support one or more user interfaces to the IOC mining system 105, as well as to support communication between the IOC mining system 105 and other related systems and devices not explicitly shown. For example, a given one of the input-output devices 108 can be configured to interface the IOC mining system 105 with an external network security system in some embodiments.

The IOC mining system 105 in this embodiment comprises a valid IOC detector 110 that includes a web crawler controller 112 and a term extraction and filtering module 114. The web crawler controller 112 is configured to direct one or more web crawlers to obtain textual information from the data sources 102 accessible over the network 104. The term extraction and filtering module 114 is configured to extract terms likely to be associated with IOCs from the obtained textual information, and to filter the extracted terms to identify terms corresponding to respective valid IOCs.

The IOC mining system 105 further comprises a link generation module 116 and an output document generator 118. The link generation module 116 is configured to generate links between the terms corresponding to the respective valid IOCs. The output document generator 118 is configured to convert the links and the corresponding terms into an output document in a specified IOC format.

The output document is further processed in the computer network 100. For example, in some embodiments, one or more parameters of a network security system are adjusted based at least in part on the output document.

As a more particular example, the output document may be transmitted by the IOC mining system 105 to one or more of the analyst devices 106 over the network 104. The one or more analyst devices 106 can then provide analyst feedback relating to the output document. One or more parameters of the filtering process implemented in the term extraction and filtering module 114 can then be adjusted based at least in part on the received feedback. It is also possible for other parameters of the valid IOC detector 110, link generation module 116 and output document generator 118 to be adjusted based at least in part on analyst feedback received from one or more of the analyst devices 106.

The IOC mining system 105 in the FIG. 1 embodiment is assumed to be implemented using at least one processing device. Each such processing device generally comprises at least one processor and an associated memory, and implements one or more functional modules for controlling certain features of the IOC mining system 105.

More particularly, the IOC mining system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals. Additional or alternative computer program products not necessarily comprising articles of manufacture are also considered embodiments of the present invention.

The network interface 124 allows the IOC mining system 105 to communicate over the network 104 with the data sources 102 and the analyst devices 106, and illustratively comprises one or more conventional transceivers.

At least portions of the valid IOC detector 110, such as portions of one or more of the web crawler controller 112 and the term extraction and filtering module 114, and additionally or alternatively at least portions of one or both of the link generation module 116 and the output document generator 118, may be implemented at least in part in the form of software that is stored in memory 122 and executed by processor 120.

It is to be understood that the particular set of elements shown in FIG. 1 for automatic extraction of IOCs from multiple data sources is presented by way of illustrative example only, and in other embodiments additional or alternative elements may be used. Thus, another embodiment may include additional or alternative systems, devices and other network entities, as well as different arrangements of modules and other components.

By way of example, in other embodiments, the IOC mining system 105 can be eliminated and the valid IOC detector 110, link generation module 116 and output document generator 118 can be implemented elsewhere in the computer network 100.

In some embodiments, the IOC mining system 105 is a part of or otherwise associated with another system, such as, for example, a security operations center (SOC) or a critical incident response center (CIRC).

Additionally or alternatively, the IOC mining system 105 can be part of or incorporate an otherwise conventional security analytics system, such as the RSA Security Analytics system commercially available from RSA, The Security Division of EMC Corporation of Hopkinton, Mass.

Other embodiments can implement the IOC mining system 105 and its associated valid IOC detector 110 as part of or in conjunction with a security information and event management (SIEM) system, such as the enVision® platform, also commercially available from RSA. In such embodiments, at least portions of the information stored in the IOC database 107 illustratively comprise IOCs and other related information extracted from security logs collected by the STEM system.

Figure 2:
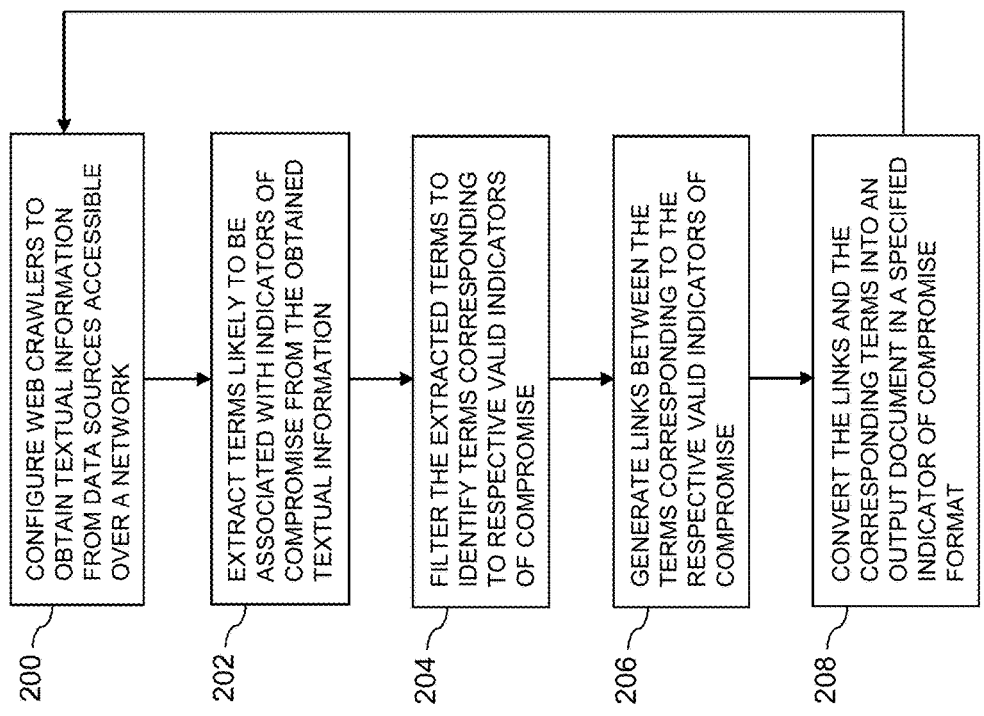
FIG. 2 is a flow diagram of an example process for automatic extraction of indicators of compromise from multiple data sources in the computer network of FIG. 1.

An exemplary process utilizing IOC mining system 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 208. Steps 200, 202 and 204 are assumed to be performed by the valid IOC detector 110 in conjunction with automatic extraction of IOCs from data sources 102. Steps 206 and 208 are examples of link generation and output document generation steps assumed to be performed by the link generation module 116 and output document generator 118, respectively, of the IOC mining system 105.

In step 200, web crawlers are configured to obtain textual information from data sources accessible over a network. The data sources illustratively comprise public data sources such as forums, blogs and social media web sites associated with one or more of the data sources 102 accessible to the IOC mining system 105 over the network 104. These are examples of public sources of textual descriptions of computer security threats.

Different types of web crawlers may be used for different types of data sources. For example, a web crawler of a first type may be configured to obtain first portions of the textual information from one or more of the data sources that render content statically without execution of client-side code, and a web crawler of a second type may be configured to obtain second portions of the textual information from one or more of the data sources that render content dynamically through execution of client-side code.

It is also possible to configure a given web crawler to download portions of the textual information from a search application programming interface (API) of a social media web site such as a Twitter site.

In some embodiments, configuring the web crawlers may comprise seeding a given one of the web crawlers with a list of web sites identified in one or more messages received from one or more of the analyst devices 106.

In step 202, terms likely to be associated with IOCs are extracted from the obtained textual information. This may involve parsing the obtained textual information to identify portions of the obtained textual information that include the terms likely to be associated with the IOCs. For example, some embodiments can be configured to parse HTML code of each of one or more web pages into a plurality of different regions, determine a quantity of text in each of the different regions, and select one or more of the regions to be subject to the extracting step based at least in part on the determined quantities of text.

Additionally or alternatively, extracting terms likely to be associated with IOCs from the obtained textual information may further comprise identifying terms that exhibit one or more predefined IOC characteristics. Examples of such predefined IOC characteristics comprise one or more of IP address characteristics and message digest characteristics.

In step 204, the extracted terms are filtered to identify terms corresponding to respective valid IOCs. The valid IOCs may comprise terms, phrases or other informational units corresponding to particular aspects of computer security threats. The filtering in some embodiments comprises characterizing network domains from which respective ones of the extracted terms originated, and then filtering the extracted terms based at least in part on the characterized network domains. A wide variety of other types of filtering can be used in other embodiments.

In step 206, links are generated between the terms corresponding to the respective valid IOCs determined above. For example, one or more such links can be generated by identifying semantic meanings of respective portions of the textual information that each include two or more of the valid IOCs, and generating at least one link between the two or more valid IOCs in a given one of the portions of the textual information based at least in part on the identified semantic meaning of that portion.

In step 208, the links and the corresponding terms are converted into an output document in a specified IOC format. Examples of IOC formats that may be used in illustrative embodiments include OpenIOC, STIX, CybOX and IODEF. In some embodiments, the links and corresponding terms may be converted into multiple output documents each in a different one of these or other IOC formats. The term "output document" as used herein is intended to be broadly construed so as to encompass, for example, any set of information complying with one of the above-noted IOC formats. In some embodiments, multiple distinct output documents are generated instead of a single output document. A given document as the term is broadly used herein may also include different parts in different IOC formats.

The process upon completion of step 208 returns to step 200 to obtain additional textual information from the data sources accessible over the network. Other types of returns can be implemented in the FIG. 2 process. For example, the process may return from step 208 to one of steps 202, 204 or 206 while also repeating step 200 and possibly one or more subsequent steps at particular designated intervals.

As indicated previously, documents generated in specified IOC formats are further processed in the computer network 100. This illustratively involves adjusting one or more parameters of a network security system based at least in part on one or more of the output documents. Such a network security system can incorporate the IOC mining system 105 or can be coupled to it via a network. It is also possible for the output documents to be transmitted from the IOC mining system 105 to one or more of the analyst devices 106. In such an arrangement, feedback may be received in the IOC mining system 105 from at least one of the analyst devices 106. At least one filter parameter of the filtering implemented in step 204 may be adjusted based at least in part on the received feedback.

Additional instances of steps 200 through 208 can be performed on a regular basis or otherwise repeated periodically in order to ensure that IOCs are effectively extracted from available public data sources.

Numerous other techniques can be used to provide automatic extraction of IOCs from data sources in the manner described above. Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect valid IOCs and to generate links and documents in a computer network. For example, the ordering of the process steps may be varied in other embodiments, or certain steps may be performed concurrently with one another rather than serially. Also, as indicated previously, the process steps or subsets thereof may be repeated periodically in conjunction with respective distinct instances of automatic extraction of IOCs from multiple data sources within a computer network.

A more detailed example of another illustrative embodiment will now be described with reference to FIG. 3.

In this embodiment, a computer network 300 comprises public data sources 302, an IOC mining system 305 ("IOC Miner") and an analyst device 306-1. The IOC mining system 305 generates output documents 325 in a plurality of different IOC formats illustratively including OpenIOC, STIX, CybOX and IODEF.

The IOC mining system 305 is configured to automate the process of IOC extraction so as to permit IOCs to be extracted in a particularly accurate and efficient manner from a wide variety of public data sources 302, which in this embodiment illustratively comprise forums, blogs, Twitter sites and other sources of textual information relating to computer security threats. For example, the IOC mining system 305 can correctly parse and identify IOCs and determine relations between those IOC from unstructured text written by authors with different styles. This embodiment utilizes natural language processing to process textual information collected from the public data sources by web crawlers and generates output documents in specified IOC formats such as OpenIOC. The resulting documents can be readily deployed by network security systems and other types of security products in facilitating the detection and remediation of malicious activity in a computer network.

The IOC mining system 305 comprises multiple distinct functional components, illustratively a text parse component ("text parser"), term extraction component ("term extractor"), a term filtering component ("term filter") and a term linking component ("term linker"). It also implements a conversion process to produce output documents 325 in one or more desired IOC formats. Each of these components of the IOC mining system 305 will be described in more detail below.

The text parser receives textual information gathered from the public data sources 302 by one or more web crawlers. As noted above, the web crawlers are configured to gather text from forums, blogs, Twitter sites and other publicly-available sources of information regarding computer security threats.

Different types of web crawlers can be used for different types of data sources. For example, static crawlers such as Scrapy can be used for those web sites that render most of their content in a static manner and can be configured to directly store the text without executing JavaScript to other client-side code. As another example, dynamic crawlers such as OpenWPM can be used for those web sites that generate text "on the fly" using client-side code. A given such dynamic crawler can visit the site and store the text when certain conditions are met, such as expiration of a specified timeout (e.g., 30 seconds).

In some embodiments, the crawling strategy is breadth-first rather than depth-first as many web sites will typically choose to catalog related computer security articles under a common channel or set of channels.

Figure 3:
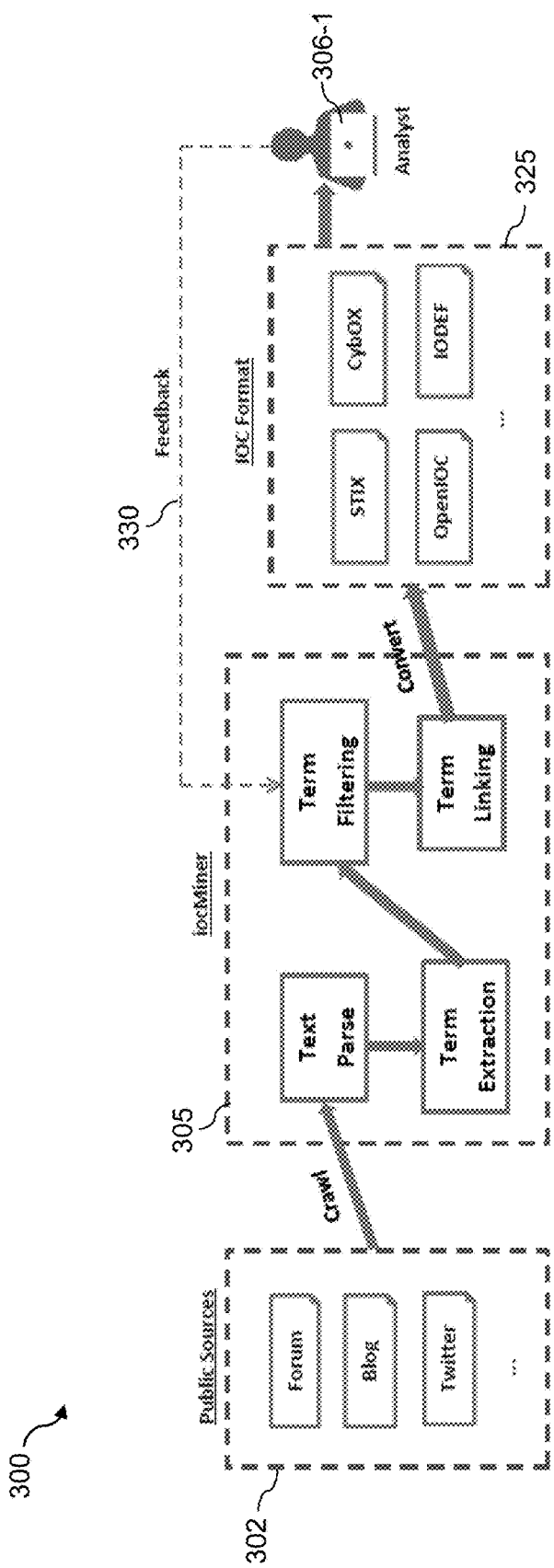
FIG. 3 shows another illustrative embodiment of a computer network configured with functionality for automatic extraction of indicators of compromise from multiple data sources.

The collection of tweets is treated as a special case in the FIG. 3 embodiment as web scraping is generally not permitted by Twitter. Therefore, the web crawlers deployed by the IOC mining system 305 can include at least one web crawler that utilizes the search APIs provided by Twitter and downloads tweets containing IOC-related keywords (e.g., "CVE" for published Common Vulnerabilities and Exposures).

It is also possible to "bootstrap" the web crawling process by configuring one or more of the web crawlers to receive from one or more analyst devices a list of web sites that are likely to contain IOC-related textual information.

The text parser is illustratively configured to convert rich-format web files (e.g., HTML) into plain text. For example, downloaded web pages may include significant textual information that is unrelated to IOCs, such as online advertisements and social network gadgets, which should be removed before further processing. Accordingly, the text parser can be configured to parse the HTML code of each of one or more web pages into a plurality of different regions, to determine a quantity of text in each of the different regions, and to select one or more of the regions to be subject to the extracting based at least in part on the determined quantities of text. Such an arrangement can make use of a document object model (DOM) parser to facilitate selection of the region having the most textual information based on an assumption that irrelevant content such as advertisements usually contain much less text than an article or other arrangement of text describing a computer security threat.

The term extractor identifies terms in the textual information that conform to predefined IOC characteristics, such as IP address characteristics or characteristics of a particular message digest type such as MD5. In particular, different types of IOCs often have distinctive characteristics which do not overlap with terms in typical human language. For example, an IPv4 address is formatted in dot-decimal notation (e.g., 192.168.0.1) and a malware message digest in MD5 is represented as a 128-bit hash value (e.g., 595f44fec1e92a71d3e9e77456ba80d1). The term extractor is configured to utilize these and other IOC characteristics in order to extract terms that are likely to be associated with IOCs.

The term filter is configured to filter the extracted terms in order to identify terms corresponding to respective valid IOCs. The filtering process illustratively involves consideration of context information in order to avoid ambiguity and facilitate identification of valid IOCs. For example, an author of a web page may have made a typographical error, or may have used one or more terms that are similar to IOCs but are not actually associated with malicious activity. Such terms should be filtered out before the next step of the process. Information from additional external sources can be used for this purpose. For example, the network domains from which the extracted terms originated can be characterized and the extracted terms filtered based at least in part on such characterized network domains. Similar processing can be applied using IP addresses associated with the extracted terms. As a more particular example, terms corresponding to known benign IP addresses and network domains can be filtered out using information obtained from online reputation ranking services such as Alexa. Additionally or alternatively, valid domains can be identified by issuing queries to DNS services and examining the corresponding response codes. A response code of NXDOMAIN indicates that the domain does not exist and therefore terms associated with that domain can be filtered out.

The term linker generates links between terms corresponding to the respective valid IOCs. This illustratively involves utilizing natural language processing to identify semantic meanings of respective portions of the textual information that each include two or more of the valid IOCs, and generating at least one link between the two or more valid IOCs in a given one of the portions of the textual information based at least in part on the identified semantic meaning of that portion. For example, a given such link can be generated to associate an IOC identifying a particular type of malware with other IOCs identifying respective behaviors associated with that particular type of malware. As a more particular example, the term linker can inspect a portion of the textual information comprising a sentence with valid IOCs, such as "A new variant of Zeus malware opens winlogon.exe," and then generate a link between two valid IOCs, Zeus and winlogon.exe, based on the presence of verb "opens." The term linker in some embodiments is configured to process textual information in multiple languages (e.g., English, Chinese, Russian, etc.), in order to support the desired natural language processing.

Figure 4:
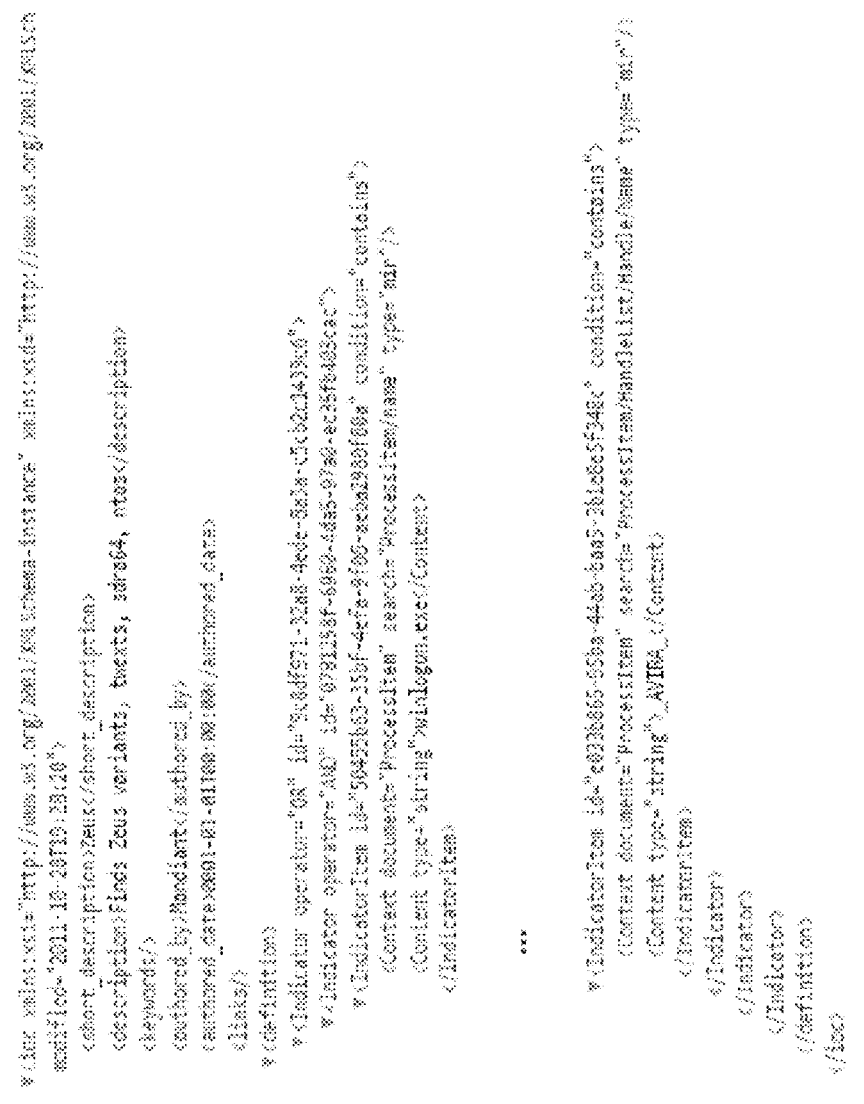

The IOC mining system 305 is further configured to convert the links and the corresponding valid IOC terms into an output document in a specified IOC format. The particular IOC format may be one of a plurality of IOC formats selectable by an analyst associated with the analyst device 306-1. These formats illustratively include one or more of the OpenIOC, STIX, CybOX and IODEF formats utilized for output documents 325. FIG. 4 shows an example of an output document generated in an OpenIOC format.

The output documents 325 are illustratively provided to the analyst device 306-1 and possibly other analyst devices of the computer network 300. Feedback 330 is provided from the analyst device 306-1 to the term filter of the IOC mining system 305 as illustrated in the figure and utilized to adjust at least one filter parameter of the filtering process of the term filter. For example, particular IOCs previously determined to be valid IOCs can be marked as invalid IOCs for future filtering operations. As a more particular example, the feedback can be used to create or update a whitelist of terms deemed irrelevant to malicious activities.

The above-described illustrative embodiments provide significant advantages relative to conventional approaches.

For example, certain embodiments through automatic extraction of IOCs from multiple data sources accessible over a network can facilitate the detection and remediation of APTs and other types of malicious activity at an early stage. In such an arrangement, the extracted IOCs can be used to adjust one or more parameters of a network security system so as to more accurately and efficiently detect and remediate malicious activity.

It is to be appreciated that these and other advantages referred to herein are merely illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. The particular configuration of the IOC mining system and its various components can be varied. Also, many different types and arrangements of data sources, web crawlers, extractors, filters, link generators, document formats and associated processes may be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
configuring one or more web crawlers to obtain textual information from a plurality of data sources accessible over at least one network;
extracting terms likely to be associated with indicators of compromise from the obtained textual information;
filtering the extracted terms to identify terms corresponding to respective valid indicators of compromise;
generating links between the terms corresponding to the respective valid indicators of compromise;
converting the links and the corresponding terms into an output document in a specified indicator of compromise format;
transmitting the output document to an analyst device;
receiving feedback from the analyst device relating to the output document; and
adjusting at least one filter parameter of the filtering based at least in part on the received feedback;
wherein the method is performed by at least one processing device comprising a processor coupled to a memory.

2. The method of claim 1 wherein the data sources comprise public sources of textual descriptions of computer security threats.

3. The method of claim 1 wherein the data sources comprise one or more of forums, blogs and social media web sites.

4. The method of claim 1 wherein configuring one or more web crawlers further comprises:
configuring a web crawler of a first type to obtain first portions of the textual information from one or more of the data sources that render content statically without execution of client-side code; and configuring a web crawler of a second type to obtain second portions of the textual information from one or more of the data sources that render content dynamically through execution of client-side code.

5. The method of claim 1 wherein configuring one or more web crawlers further comprises configuring a given web crawler to download portions of the textual information from a search application programming interface of a social media website.

6. The method of claim 1 wherein configuring one or more web crawlers further comprises seeding a given one of the web crawlers with a list of web sites identified in one or more messages received from an analyst device.

7. The method of claim 1 further comprising parsing the obtained textual information to identify portions of the obtained textual information that include the terms likely to be associated with the indicators of compromise.

8. The method of claim 1 wherein extracting terms likely to be associated with indicators of compromise from the obtained textual information further comprises identifying terms that exhibit one or more predefined indicator of compromise characteristics.

9. The method of claim 8 wherein the predefined indicator of compromise characteristics comprise one or more of Internet Protocol address characteristics and message digest characteristics.

10. The method of claim 1 wherein filtering the extracted terms to identify terms corresponding to respective valid indicators of compromise further comprises:
characterizing network domains from which respective ones of the extracted terms originated; and
filtering the extracted terms based at least in part on the characterized network domains.

11. The method of claim 1 wherein generating links between the terms corresponding to the respective valid indicators of compromise further comprises:
identifying semantic meanings of respective portions of the textual information that each include two or more of the valid indicators of compromise; and
generating at least one link between the two or more valid indicators of compromise in a given one of the portions of the textual information based at least in part on the identified semantic meaning of that portion.

12. The method of claim 1 further comprising adjusting one or more parameters of a network security system based at least in part on the output document.

13. A method comprising:
configuring one or more web crawlers to obtain textual information from a plurality of data sources accessible over at least one network;
extracting terms likely to be associated with indicators of compromise from the obtained textual information;
filtering the extracted terms to identify terms corresponding to respective valid indicators of compromise;
generating links between the terms corresponding to the respective valid indicators of compromise; and
converting the links and the corresponding terms into an output document in a specified indicator of compromise format;
the method further comprising:
parsing the obtained textual information to identify portions of the obtained textual information that include the terms likely to be associated with the indicators of compromise;
wherein parsing the obtained textual information further comprises:

parsing HTML code of each of one or more web pages into a plurality of different regions;
determining a quantity of text in each of the different regions; and
selecting one or more of the regions to be subject to the extracting based at least in part on the determined quantities of text;
wherein the method is performed by at least one processing device comprising a processor coupled to a memory.

14. A computer program product comprising a non-transitory processor-readable storage medium having stored therein program code of one or more software programs, wherein the program code when executed by at least one processing device causes said at least one processing device:
to configure one or more web crawlers to obtain textual information from a plurality of data sources accessible over at least one network;
to extract terms likely to be associated with indicators of compromise from the obtained textual information;
to filter the extracted terms to identify terms corresponding to respective valid indicators of compromise;
to generate links between the terms corresponding to the respective valid indicators of compromise;
to convert the links and the corresponding terms into an output document in a specified indicator of compromise format;
to transmit the output document to an analyst device;
to receive feedback from the analyst device relating to the output document; and
to adjust at least one filter parameter of the filtering based at least in part on the received feedback.

15. The computer program product of claim 14 wherein extracting terms likely to be associated with indicators of compromise from the obtained textual information further comprises identifying terms that exhibit one or more predefined indicator of compromise characteristics.

16. The computer program product of claim 14 wherein generating links between the terms corresponding to the respective valid indicators of compromise further comprises:
identifying semantic meanings of respective portions of the textual information that each include two or more of the valid indicators of compromise; and
generating at least one link between the two or more valid indicators of compromise in a given one of the portions of the textual information based at least in part on the identified semantic meaning of that portion.

17. An apparatus comprising:
at least one processing device comprising a processor coupled to a memory;
said at least one processing device being configured:
to direct one or more web crawlers to obtain textual information from a plurality of data sources accessible over at least one network;
to extract terms likely to be associated with indicators of compromise from the obtained textual information;
to filter the extracted terms to identify terms corresponding to respective valid indicators of compromise;
to generate links between the terms corresponding to the respective valid indicators of compromise;
to convert the links and the corresponding terms into an output document in a specified indicator of compromise format;
to transmit the output document to an analyst device;
to receive feedback from the analyst device relating to the output document; and to adjust at least one filter parameter of the filtering based at least in part on the received feedback.

18. The apparatus of claim 17 wherein said at least one processing device is further configured to adjust one or more parameters of a network security system based at least in part on the output document.

19. The apparatus of claim 17 wherein filtering the extracted terms to identify terms corresponding to respective valid indicators of compromise further comprises:
   characterizing network domains from which respective ones of the extracted terms originated; and
   filtering the extracted terms based at least in part on the characterized network domains.

20. The apparatus of claim 17 wherein generating links between the terms corresponding to the respective valid indicators of compromise further comprises:
   identifying semantic meanings of respective portions of the textual information that each include two or more of the valid indicators of compromise; and
   generating at least one link between the two or more valid indicators of compromise in a given one of the portions of the textual information based at least in part on the identified semantic meaning of that portion.

\* \* \* \* \*